United States Patent
Pellett et al.

[11] 3,864,577
[45] Feb. 4, 1975

[54] TANK FILLING MONITOR

[75] Inventors: Jacques Pierre Pellett, Chatou; Henri Bernard André Baisan, St. Genie les Ollieres; Jean Lievaux, Pantin; Georges Patchett, Le Chesnay, all of France

[73] Assignee: The British Petroleum Company Limited, London, England

[22] Filed: Nov. 7, 1973

[21] Appl. No.: 413,497

[30] Foreign Application Priority Data
Nov. 7, 1972 France .............................. 72.39401

[52] U.S. Cl. .................................. 250/577, 356/136
[51] Int. Cl. ........................................... G01n 21/46
[58] Field of Search ........................... 250/577, 227; 356/135–137

[56] References Cited
UNITED STATES PATENTS
2,807,976  10/1957  Vossberg ............................. 356/136
3,485,262  12/1969  Perren ............................. 250/577 X
3,596,673  8/1971  Laucournet ..................... 250/577 X FOREIGN PATENTS OR APPLICATIONS
888,941  2/1962  Great Britain ...................... 250/577
1,593,760  6/1970  France ................................. 250/577
906,609  9/1962  Great Britain ...................... 250/577

Primary Examiner—Walter Stolwein
Attorney, Agent, or Firm—Morgan, Finnegan, Durham & Pine

[57] ABSTRACT

Tank filling monitor based on the attenuation of a light signal transmitted by an isosceles prism with total internal reflection as the prism is progressively immersed in a liquid of differing refractive index from the atmosphere. Optical fibres of appropriate length may be used to convey the incident light from the source to the prism and from the prism to a light detector.

3 Claims, 3 Drawing Figures

PATENTED FEB 4 1975

3,864,577

TANK FILLING MONITOR

The present invention relates to a device for monitoring the filling of a tank or a receptacle, based on the attenuation of a luminous signal transmitted by an isosceles prism with double total reflection when the prism is progressively immersed in liquid having a refractive index different from that of the surrounding atmosphere.

According to the invention there is provided a monitor, suitable for checking the level of a tank or container having a filler valve, which monitor comprises a downwardly pointing isosceles prism, said prism being totally internally reflecting in air and substantially transmitting when immersed in a liquid, a light source and a light detecting means positioned remote from said prism, there being a system of optical fibres adapted to transmit light from the light source into the prism and to transmit light totally internally reflected in the prism to the light detector, a part of the optical fibre system being common to both the incident and reflected light rays at the prism, said light detector being capable of initiating the closure of the tank filler valve when the light intensity received from the prism falls below a pre-determined threshhold.

In particular, an isosceles prism placed at the maximum filling level and the base of which is horizontal, and the apex of which is at a level slightly lower than that of this base, reflects totally from its symmetrical surfaces inclined at 45° to the vertical incident light rays as long as it is not immersed in liquid contained in the tank. When the level of the said liquid reaches a reference level corresponding for example to the total immersion of the said isosceles prism, the incident pencil of light falling on this prism is almost totally refracted into the liquid, the light detector receiving the reflected rays only receiving, for example in the case of hydrocarbons, 4 percent of the incident light, because the angle of total reflection, instead of being less than 45°, in this case reaches 71°.

The light detector is therefore chosen in such a way that below a certain threshold of light intensity no perceptible signal reaches the detector e.g., the naked eye or in such a way that below such a threshold the signal received can no longer keep open an electromagnetic sluice gate controlling the arrival of liquid in the tank, against the action of a spring tending to close this sluice-gate.

Further, optical fibres of appropriate length may be used to convey the light rays both from the light source to the prism and from the prism to the light detecting and receiving means.

The length of the optical fibres used is limited by the absorption of the light rays by the glass constituting these optical fibres, by the intensity of the luminous flux emitted by the source and by the sensitivity of the receiver used.

Some known devices have the source of light and the cell both placed in the immediate vicinity of the prism for detecting the filling level, possibly inside a gaseous, and explosive atmosphere.

However, it is possible by the use of optical fibres to locate the source of light and the cells controlling the electromagnetic valves for filling in the air at considerable distances from the prisms whose immersion it is desired to monitor.

The light receiver, instead of being the human eye, may comprise an industrial photo-sensitive cell, the electronic output signal of the said receiver being transmitted to the system which it is desired to bring under control. When this signal falls below a given threshold, an electromagnetic valve for the passage of liquid closes, for example under the action of a spring.

Also two similar prisms placed at different levels may be used to control via optical/electronic servomechanisms, (a) the closure of a large-output electromagnetic valve for a fixed filled level of the tank at the point of location of the first of these prisms so as to slow down the filling and only allow filling to proceed via a low-output electromagnetic valve in parallel with the large-output one, and (b) the closure of the low-output electromagnetic valve when the liquid reaches a marked level, generally a little lower than the reference level corresponding to that of the base of the second prism.

These prisms may also be replaced by cones of revolution surmounted or not by cylinders with vertical axes.

The stopping of the filling of the tank or receptacle generally occurs before the corresponding prism is completely immersed, the liquid stopping at a variable distance from the above-mentioned reference level, this distance varying according to the height of the prism or the cone used, the value of the angle at the apex of this prism or this cone and the sensitivity of the receiver used.

It is possible to vary the angle at the apex of the prism or cone used depending upon the refraction index of the liquid whose level in the said tank or the said receptacle is to be detected. In this case, the angle of the incident rays must be modified so that the rays reflected on the first total reflection face remain horizontal.

The rays reflected by the second total reflection face retain in this way an angle symmetrical to that of the incident rays.

As an example, the device may be used in accordance with the invention in the case of the separation of two superimposed liquids such as a hydrocarbon and water, by placing the prism or cone at the level of the lower part of a hydrocarbon drainage siphon.

The variation of the reflected signal when the prism is immersed in water instead of in hydrocarbon defines a marked level which makes it possible to prevent the arrival of water before it can reach the top of the lower part of the said drainage siphon.

An advantage of the present invention resides in the fact that the device is of the fail-safe type, because the opening of the electromagnetic valve does not occur in the event of the breakage of the optical fibres or of certain connections, in the event of the extinction of the source of light, or in the event of the failure of the receiver.

The marked level at which the electromagnetic valve closes is not influenced by the temperature, colour or density of the filling liquid.

The present invention will now be described with reference to FIGS. 1 to 3 of the accompanying drawings.

FIG. 1 is a diagrammatic representation showing in the case of the filling of a tank the trajectory of light rays emitted from a source of light and reflected successively on a first mirror, on the two symmetrical faces of a prism which gives a double total reflection in air, and on a second mirror, before reaching a receiver intended to detect the extinction of the said signal at the moment when the prism is almost completely immersed in the filling liquid whose level it is desired to monitor;

Figure 1:
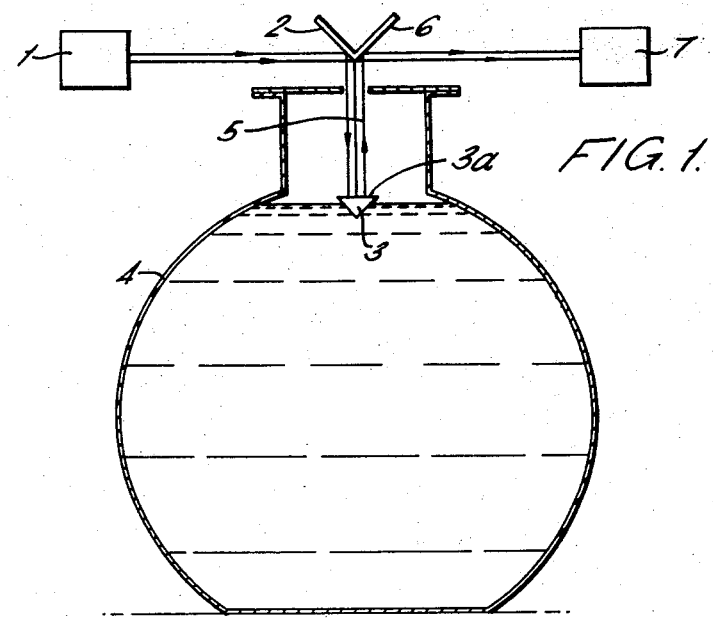

From FIG. 1 it is seen that the parallel light rays emitted by a source of light 1 are reflected firstly on a mirror 2 inclined at 45° to the horizontal, vertically, to the base 3a of a prism 3. These rays undergo two total reflections on the two symmetrical inclined faces of the prism 3, before being reflected back in the direction of the arrow 5 on to a second mirror 6 also inclined at 45° to the horizontal, which reflects back the rays on to a receiver 7. This receiver 7 may be the human eye or a device monitoring the intensity of the said reflected rays. The receiver 7 may be adapted to actuate an electromagnetic valve controlling the filling rate of the said tank 4.

Figure 2:
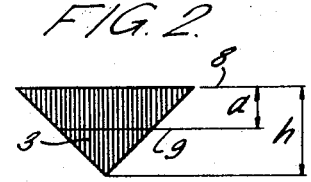
FIG. 2 is a diagrammatic representation showing the reference level corresponding to the level at which the filling of the tank stops.

As stated above, the prism 3 has a reference level 8 visible in FIG. 2 and corresponding to the complete immersion of the prism. But as the incident light rays are limited to a median zone of the said prism, the extinction of the signal corresponding to the reduced percentage of rays reflected by this prism is achieved before this total immersion, and the sensitivity of the receiver 7 employed defines in practice a marked level 9 at which the filling of a tank or of an intermediate mineral water dosing receptacle stops. The distance a between the two levels 8 and 9 is equal to a variable fraction of the height h of the said prism.

However, the accuracy achieved in filling corresponds, irrespective of the sensitivity of the receiver employed, to a variation in level which is less than the height h of the prism employed, which in general is very small in relation to the height of the tank to be filled.

Figure 3:
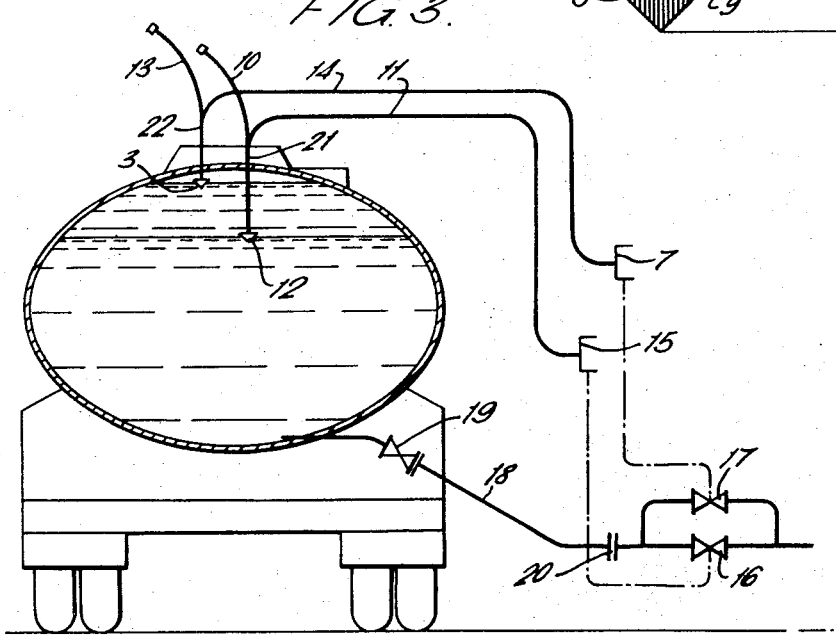
FIG. 3 is a diagrammatic representation of a double level monitoring device using optical fibres, and enabling the control of (a) the closure of a high-output valve so as to slow down the rate of filling and (b) the control of a low-output valve, so as to bring about the total stoppage of filling of the tank before the corresponding prism is completely immersed in the filling liquid.

In the case of the form of embodiment illustrated by FIG. 3, two devices similar to that shown in FIG. 1 are used, but in which the incident and reflected light rays are channelled respectively into optical fibres 10 and 11 in the case of the prism 12 controlling the slowing down of the filling, and into optical fibres 13 and 14 in the case of prism 3 controlling the complete stoppage of filling.

The light detectors 15, 7 which receive the light rays reflected respectively by the two prisms 12 and 3 control respectively, the closure of an electromagnetic valve 16 with a high rate of flow, and that of an electromagnetic valve 17 having a reduced rate of flow, bringing about successively a slowing down in the rate of flow of filling liquid passing into the piping 18. This liquid is then only able to pass through the electromagnetic valve 17 with a reduced rate of flow until this valve itself is closed by the effect of the extinction of the signal received by the receiver 7.

The filling pipe 18 also comprises a general electromagnetic valve 19 with manual control, and a closure cock 20.

The two optical fibres 10 and 11 have a common portion 21, and similarly the two optical fibres 13 and 14 have a common portion 22.

Various changes, improvements or additions may be made in the form of embodiment described, and certain units may be replaced by equivalent units without thereby altering the general nature of the invention.

We claim:

1. An apparatus for providing a desired liquid level during filling of a contaianer having a filler valve coupled thereto comprising:

a first prism having a downwardly pointing apex, said first prism being totally internally reflecting in air and substantially transmitting when immersed in a container including liquid;

light source means and first light detecting means positioned remote from said first prism;

first optical fibers optically coupling said light source means, said first prism, and said first light detecting means, for transmitting light from said light source means into said first prism and for transmitting light which is totally internally reflected in said first prism to said first light detecting means, said first optical fibers including a portion common to the incident light and the reflected light from said first prism;

said first light detecting means initiating closure of the filler valve when the light intensity received from said first prism falls below a predetermined threshold;

a second prism having a downwardly pointing apex, said second prism being totally internally reflecting in air and substantially transmitting when immersed in a container including liquid, said second prism being positioned at a lower level than the desired liquid level which is determined by said first prism;

a second light detecting means positioned remote from said second prism;

second optical fibers optically coupling said light source means, said second prism, and said second light detecting means, for transmitting light from said light source means into said second prism and for transmitting light which is totally internally reflected in said second prism to said second light detecting means, said second optical fibers including a portion common to the incident light and the reflected light from said second prism; and said second light detecting means reducing the flow of liquid through the filler valve when the light intensity received from the second prism falls below a predetermined threshold.

2. An apparatus as claimed in claim 1 wherein:
said light source means includes a pair of light sources, one of said light sources optically coupled to said first optical fibers and the other of said light sources optically coupled to said second optical fibers.

3. An apparatus as claimed in claim 1 wherein:
said first and second prisms are isoceles prisms.

* * * * *